I. B. BOYCE.
Means for Preventing the Loss of Nuts from Axles.

No. 208,669. Patented Oct. 8, 1878.

WITNESSES

INVENTOR

By his Att'ys.

UNITED STATES PATENT OFFICE.

ISAAC B. BOYCE, OF LYNN, MASSACHUSETTS.

IMPROVEMENT IN MEANS FOR PREVENTING THE LOSS OF NUTS FROM AXLES.

Specification forming part of Letters Patent No. 208,669, dated October 8, 1878; application filed April 2, 1878.

*To all whom it may concern:*

Be it known that I, ISAAC B. BOYCE, of Lynn, in the county of Essex and State of Massachusetts, have invented a new and useful Improvement in Nuts for Axles of Vehicles and other purposes, of which the following is a specification:

This invention relates especially to axle-nuts for holding the wheels of vehicles upon their spindles, although it may be used in connection with suitable shafts, rods, spindles, &c., of various kinds, and for different purposes.

It is, of course, well known that axle-nuts often become loose and drop off, thus allowing the wheel to come off, and endangering life and property.

This device is intended to effectually prevent all possibility of the loss of a nut, and hence the dropping of a wheel, and also to warn the occupant of the carriage, by its rattling, that the nut is loose.

Figure 1:
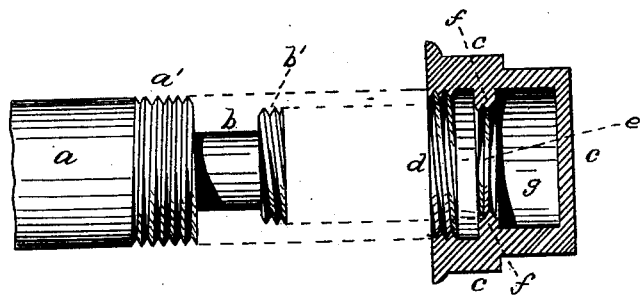
Figure 2:
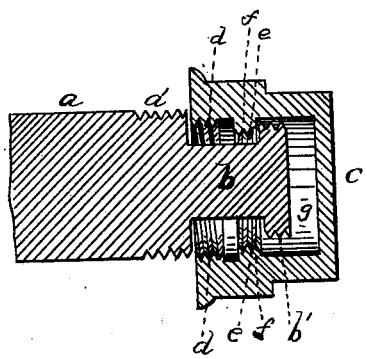
Figure 3:
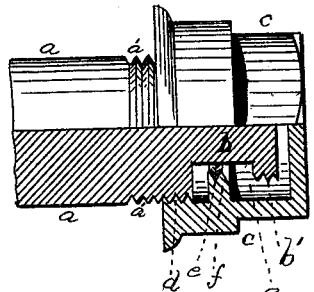

In the drawings, in which similar letters of reference indicate like parts, Figure 1 is a side elevation of the spindle or axle and a section of the nut, the said nut and axle being detached. Fig. 2 is a longitudinal section of the spindle and nut when the latter has become loose. Fig. 3 is a view, part in section and part in elevation, of the spindle and nut, the latter being in its proper position.

$a$ represents the spindle or end of the axle, and $a'$ the screw-thread which engages the corresponding screw-thread $d$ in the nut $c$.

$b$ is a T-shaped bolt, either secured to or made a part of the spindle $a$, and provided at its thick or outer end with the screw-thread $b'$, which engages the corresponding screw-thread $e$ cut upon the bridge $f$, in the nut $c$, the spindle and nut represented being intended for a near wheel. The thread $a'$ is a left-hand thread, and the thread $b'$ is a right-hand thread, (or whatever would be the opposite of the thread $a'$.)

$g$ is a chamber in the nut $c$, between the bridge $f$ and the end of the nut.

In practice my invention operates as follows: To put on the nut, first screw the thread $e$ cut on the bridge $f$ upon the screw $b'$ cut on the T-shaped bolt $b$. This brings the spindle and nut into the position shown in Fig. 2, the bolt $b$ being long enough to extend from the mouth of the nut into the chamber $g$. Then screw the nut firmly upon the spindle by means of the screw-threads $a'$ and $d$, as seen in Fig. 3. Now, if the nut becomes loose by unscrewing, so that it disengages itself from the thread $a'$ upon the spindle $a$, it does not drop off and let the wheel down, as would ordinarily be the case, but it drops into the position shown in Fig. 2. The T-shaped bolt $b$ lies in the chamber $g$ and the nut rattles upon the bolt $b$, thus acting as an alarm to the occupants of the carriage; but it cannot come off, because, in order to do so, it must be unscrewed from the bolt $b$ by means of the threads $b'$ and $e$. Of course this is practically an impossibility, as the nut has fallen down, the upper side of its chamber $g$ lying upon the screw-thread $b'$ of the bolt. This thread $b'$, being usually (but not necessarily) the opposite of the thread $a'$, adds even more to the safety of the nut. The T-shaped bolt $b$ is made long enough, and the chamber $g$ is made wide and deep enough, to allow of a considerable rattling, so that the driver may hear it at once, although a carriage could run indefinitely without injury beyond the gradual wear of the nut, even if the said nut were not soon replaced in its proper position.

A slight variation of the details of the invention, and one which I may use in practical operation, is to extend the bridge $f$ toward or to the open or outer end of the nut, cutting the thread $e$ upon it as far as it extends toward the mouth of the nut. In that case the diameter of the spindle $a$, at the part where the thread $a'$ is cut, must be lessened in order to engage the thread $e$ upon the bridge $f$.

The principle of the invention, of course, would remain the same in this variation, as the T-shaped bolt would pass beyond the bridge in the same manner and perform the same function as above described.

Figure 4:
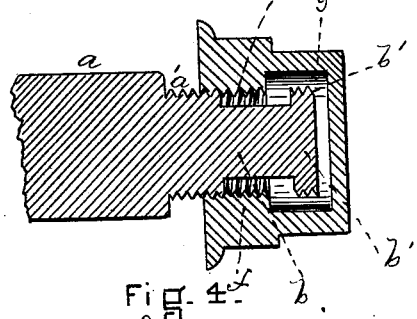

Fig. 4 illustrates the above-described variation of the invention.

Thus it will be seen that the sudden dropping off of a wheel without any warning is prevented in a simple and effective manner.

The nut and spindle herein shown are intended to be used wherever they will be of service.

Having thus fully described my invention, what I claim, and desire to secure by Letters Patent, is—

The combination of the spindle $a\ a'$, provided with the T-shaped bolt $b\ b'$, and the nut $c$, provided with the bridge $f$, chamber $g$, and screw-thread $e$, all arranged and constructed substantially as and for the purposes hereinbefore set forth.

ISAAC B. BOYCE.

Witnesses:
HENRY W. WILLIAMS,
B. W. WILLIAMS.